United States Patent
Christopher et al.

(10) Patent No.: US 10,764,287 B2
(45) Date of Patent: Sep. 1, 2020

(54) SECURE DEFAULT USER ACCOUNT FOR EMBEDDED SYSTEMS

(71) Applicant: American Megatrends International, LLC, Norcross, GA (US)

(72) Inventors: Samvinesh Christopher, Suwanee, GA (US); Anurag Bhatia, Lilburn, GA (US); Winston Thangapandian, Suwanee, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 271 days.

(21) Appl. No.: 15/666,944

(22) Filed: Aug. 2, 2017

(65) Prior Publication Data
US 2019/0044944 A1    Feb. 7, 2019

(51) Int. Cl.
*H04L 29/06* (2006.01)
*H04L 29/12* (2006.01)
*H04L 29/08* (2006.01)

(52) U.S. Cl.
CPC .......... *H04L 63/10* (2013.01); *H04L 61/2015* (2013.01); *H04L 63/08* (2013.01); *H04L 67/306* (2013.01)

(58) Field of Classification Search
CPC ..... H04L 63/10; H04L 61/2015; H04L 63/08; H04L 67/306
See application file for complete search history.

(56) References Cited

U.S. PATENT DOCUMENTS

| | | | | |
|---|---|---|---|---|
| 6,971,005 B1 * | 11/2005 | Henry | ................ | H04L 63/0815 713/155 |
| 7,069,433 B1 * | 6/2006 | Henry | ................... | G06Q 40/00 380/270 |
| 7,257,515 B2 * | 8/2007 | Haeuptle | ........... | G05B 23/0235 340/511 |
| 7,788,709 B1 * | 8/2010 | Henry | ................... | G06Q 40/00 380/270 |
| RE45,532 E * | 5/2015 | Henry | ................... | G06Q 40/00 380/270 |
| 9,749,857 B2 * | 8/2017 | Hu | ......................... | H04W 8/20 |
| 10,225,096 B2 * | 3/2019 | Ansari | ............. | H04L 29/06027 |

(Continued)

OTHER PUBLICATIONS

Zhuo et al ("Zhuo," Remote Management with the Baseboard Management Controller in Eight-Generation Dell Poweredge Servers, Dell Power Solutions, pp. 26-29, Oct. 2004) (Year: 2004).*

(Continued)

*Primary Examiner* — Luu T Pham
*Assistant Examiner* — James J Wilcox
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a service processor. The service processor sends to a DHCP server a request-to-acquire for acquiring an IP address. The service processor then receives a response from the DHCP server. The response includes a first user name. The service processor further configures a user account in association with the first user name on the service processor. The user account allows access to the service processor.

14 Claims, 7 Drawing Sheets

(56) References Cited

U.S. PATENT DOCUMENTS

| | | | | |
|---|---|---|---|---|
| 2007/0130286 | A1* | 6/2007 | Hopmann | H04W 12/04031 709/217 |
| 2007/0203999 | A1* | 8/2007 | Townsley | H04L 29/1282 709/207 |
| 2008/0170690 | A1* | 7/2008 | Tysowski | H04W 8/205 380/270 |
| 2009/0119256 | A1* | 5/2009 | Waters | G06F 16/9535 |
| 2009/0119280 | A1* | 5/2009 | Waters | H04W 4/60 |
| 2010/0125652 | A1* | 5/2010 | Rantapuska | H04L 12/2829 709/222 |
| 2010/0241861 | A1* | 9/2010 | Yoshinnoto | H04L 61/2015 713/170 |
| 2010/0251347 | A1* | 9/2010 | Roskind | H04L 63/0815 726/5 |
| 2010/0299417 | A1* | 11/2010 | Austin | H04N 21/4122 709/221 |
| 2010/0299523 | A1* | 11/2010 | Henry | H04L 63/083 713/168 |
| 2011/0106786 | A1* | 5/2011 | Waters | G06F 16/951 707/709 |
| 2011/0106787 | A1* | 5/2011 | Waters | H04L 41/5064 707/709 |
| 2011/0191223 | A1* | 8/2011 | Singh | H04L 63/08 705/34 |
| 2012/0196587 | A1* | 8/2012 | Tysowski | H04L 67/1095 455/418 |
| 2013/0104204 | A1* | 4/2013 | Henry | H04L 9/0863 726/5 |
| 2014/0038584 | A1* | 2/2014 | Tysowski | H04W 12/0609 455/419 |
| 2015/0032863 | A1* | 1/2015 | Sinha | H04L 65/1073 709/220 |
| 2016/0112452 | A1* | 4/2016 | Guevin | H04L 61/103 726/1 |
| 2016/0352970 | A1* | 12/2016 | Akutsu | H04N 1/00408 |
| 2018/0191708 | A1* | 7/2018 | Saha | G06F 21/31 |

OTHER PUBLICATIONS

Zhao (DHCP User-Based Authentication, DHC Working Group, Internet-Draft, Huawei Technologies, Sep. 22, 2006, pp. 1-24) (Year: 2006).*

Netgear ProSAFE WC9500 High Capacity Wireless Controller, Configuring Microsoft DHCP for the Wireless LAN, 2013, pp. 1-11) (Year: 2013).*

Lu-Design and Implementation of DHCP & LDAP Directory Service Integrated Management System, IEEE, 2002, pp. 758-762 (Year: 2002).*

Giordano-Enhanced DHCP Client, CHANTS'07, Sep. 14, 2007, Montreal, Quebec, Canada, pp. 91-92 (Year: 2007).*

* cited by examiner

SECURE DEFAULT USER ACCOUNT FOR EMBEDDED SYSTEMS

BACKGROUND

Field

The present disclosure relates generally to computer systems, and more particularly, to a service processor that can securely create a default user account based on information provided by a Dynamic Host Configuration Protocol (DHCP) server.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

To allow remote access and management over a network, embedded systems needs to provide a user account for validating the credentials. The user account settings are to be known only to valid users who manage the system. Each type of embedded systems may be manufactured with a same firmware with same default settings. The default settings include the default user account values that are documented by the manufacturer and, thus, publicly known. Since the user account values are known, all these systems are vulnerable to attacks before the default account are changed. In large enterprises, there are hundreds of embedded systems employed and often left with the default settings.

Further issues include that normally the firmware of an embedded system cannot be changed by users and that even if manufacturer provides a way to change default settings, it is cumbersome to change hundreds of devices manually.

Thus, there is a need for a mechanism that enables automatic device configuration of a default user account defined by a network administrator of the enterprise.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a service processor. The service processor sends to a DHCP server a request-to-acquire for acquiring an IP address. The service processor then receives a response from the DHCP server. The response includes a first user name. The service processor further configures a user account in association with the first user name on the service processor. The user account allows access to the service processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
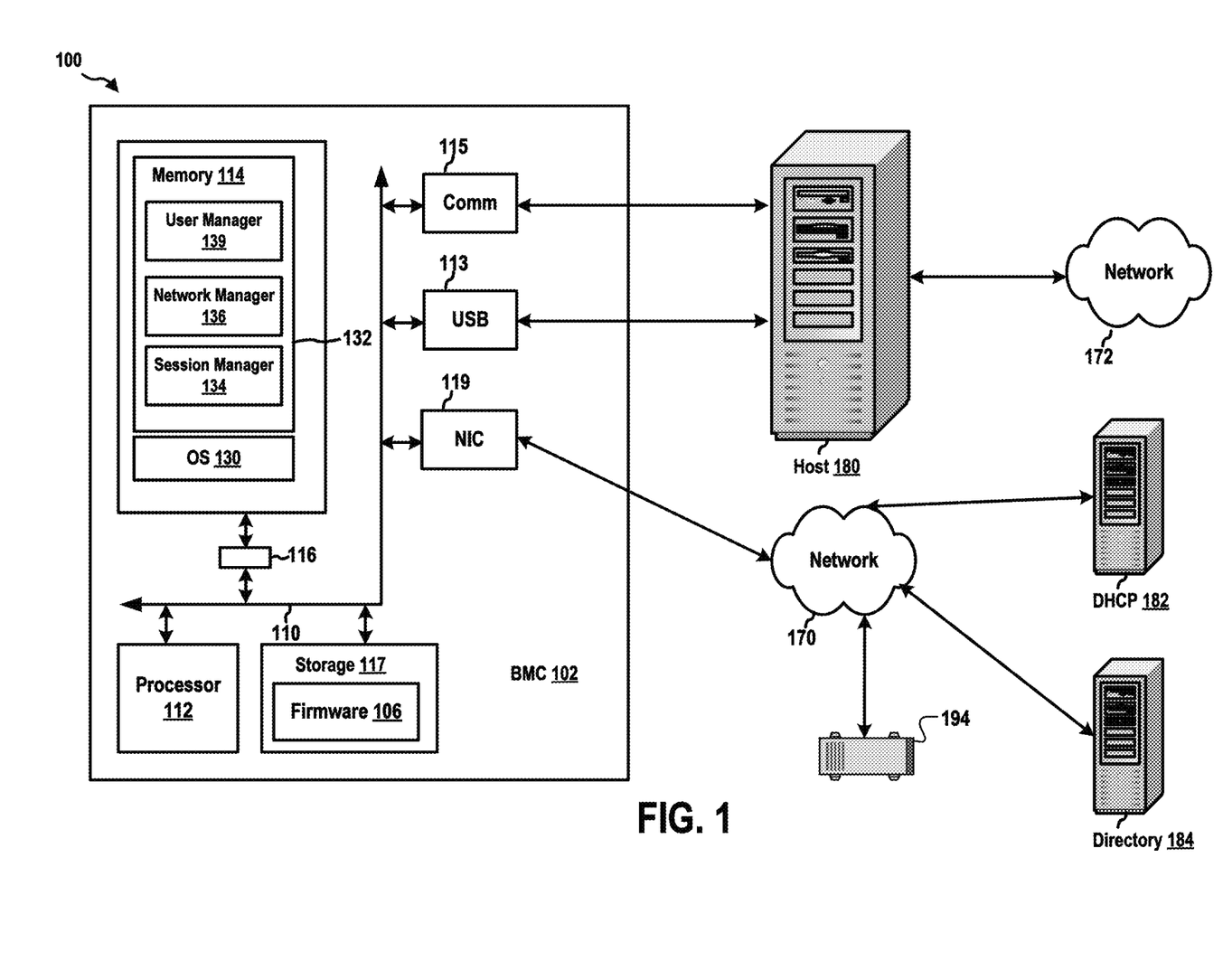
FIG. 1 is a diagram illustrating a computer system.

FIG. 1 is a diagram 100 illustrating a computer system. In this example, the computer system includes, among other devices, a BMC 102 and a host computer 180. The BMC 102 has, among other components, a processing unit 112, a memory 114, a memory driver 116, a storage 117, a network interface card 119, a USB interface 113 (Universal Serial Bus), and other communication interfaces 115.

The communication interfaces 115 may include a keyboard controller style (KCS), a server management interface chip (SMIC), a block transfer (BT) interface, a system management bus system interface (SSIF), and/or other suitable communication interface(s). Further, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the processing unit 112, the memory 114, the memory driver 116, the storage 117, the network interface card 119, the USB interface 113, and/or the communication interfaces 115 may be on the same chip. In addition, the memory 114, the processing unit 112, the memory driver 116, the storage 117, the communication interfaces 115, and/or the network interface card 119 may be in communication with each other through a communication channel 110 such as a bus architecture.

The BMC 102 may store BMC firmware 106 in the storage 117. The storage 117 may utilize a non-volatile, non-transitory storage media. When the processing unit 112 executes the BMC firmware 106, the processing unit 112 loads code and data of the BMC firmware 106 into the memory 114. In particular, the BMC firmware 106 can provide in the memory 114 an OS 130 (operating system) and service components 132. The service components 132 includes, among other components, a session manager 134, a network manager 136, and a user manager 139. The service components 132 may also include other service management components such as IPMI components. Further, the service components 132 may be implemented as a service stack. As such, the BMC firmware 106 provides an embedded system to the BMC 102.

The BMC 102 may be in communication with the host computer 180 through the USB interface 113, the network interface card 119, the communication interfaces 115, and/or the IPMI interface. The host computer 180 includes various components including one or more host services. The service stack of the BMC 102 may manage the host computer 180 and is responsible for managing and monitoring the server vitals such as temperature and voltage levels. The service stack can also facilitate administrators to remotely access and manage the host computer 180. In particular, the BMC 102 may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and out-of-band to the data network 172. In certain configurations, the communication network 170 may not be connected to the Internet. In certain configurations, the communication network 170 may be in communication with the data network 172 and/or the Internet. In addition, through the communication network 170, a remote device 194 may communicate with the BMC 102. For example, the remote device 194 may send IPMI messages to the BMC 102 over the communication network 170. Further, a Dynamic Host Configuration Protocol (DHCP) server 182 and a directory server 184 are in the communication network 170 and may be in communication with the BMC 102. The directory server 184 may be a MICROSOFT® Active Directory server or a Lightweight Directory Access Protocol (LDAP) server.

Figure 2:
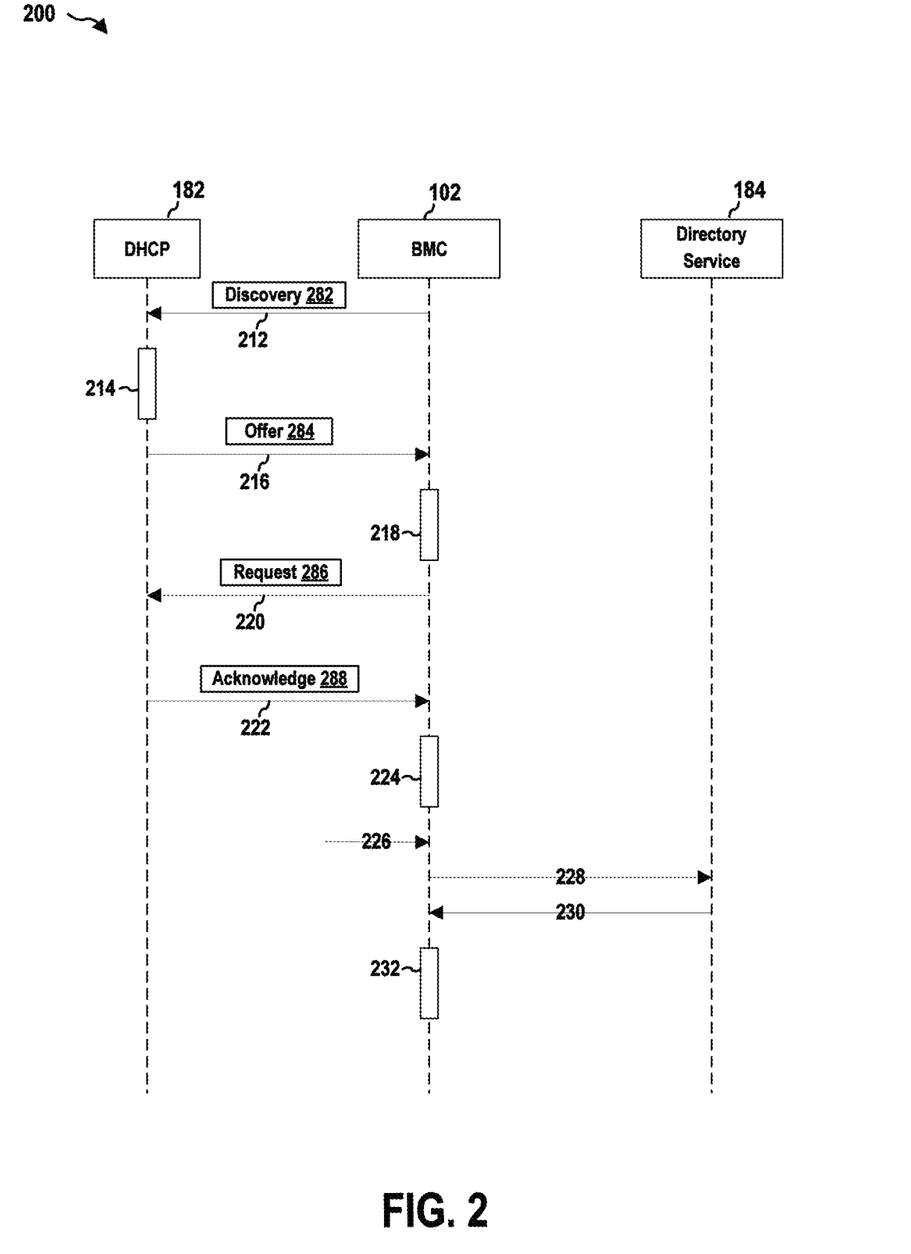
FIG. 2 is a diagram illustrating a sequence of operations for configuring a default user account at a service processor.

FIG. 2 is a diagram 100 illustrating a sequence of operations for configuring a default user account at a service processor. As described supra, the BMC 102 is placed in the same network (e.g., the communication network 170) with the DHCP server 182 and the directory server 184. In this example, the BMC 102 has been placed in the communication network 170 but has not yet acquired an IP address.

Further, the BMC 102 needs to configure a default user account that allows a user to manage the BMC 102. Therefore, after the BMC 102 is booted, the BMC 102 initiates a procedure to acquire an IP address and default user account information from the DHCP server 182.

More specifically, at operation 212, the network manager 136 of the BMC 102 broadcasts a DHCP discover message 282. The DHCP discover message 282 is directed to DHCP servers in the communication network 170 and is received by the DHCP server 182. The DHCP discover message 282 includes, among other elements, DHCP request information and one or more DHCP options. In particular, the DHCP discover message 282 includes data elements indicating network information of the BMC 102.

Optionally, the DHCP options may include option 60 vendor class identifier as defined in "Network Working Group Request for Comments: 2132, March 1997, DHCP Options and BOOTP Vendor Extensions" (DHCP Specification) which is expressly incorporated by reference herein in its entirety. The vendor class identifier may indicate a particular vendor or manufacturer of the BMC 102.

At operation 214, upon receiving the DHCP discover message 282, the DHCP server 182 reserves an IP address for the BMC 102. The DHCP server 182 then prepares an offer message 284 that is to be sent to the BMC 102. The offer message 284 includes, among other elements, a lease offer of the reserved IP address and one or more DHCP options. Further, the DHCP server 182 may be configured with a pre-selected user name in a pre-selected domain that is to be served as the user name of the default user account of any BMC (or other devices). The pre-selected domain is identified by a pre-selected domain name.

In one configuration, the DHCP server 182 may include the pre-selected domain name and the pre-selected user name in an DHCP option without checking the vendor class identifier. As such, the DHCP server 182 may include the pre-selected domain name and the pre-selected user name in option 43 vendor specific information, as defined in the DHCP Specification, of the offer message 284.

In another configuration, the DHCP server 182 checks whether the DHCP discover message 282 from the BMC 102 includes a vendor class identifier matches a target vendor class identifier. The vendor class identifier may indicate whether a BMC supports configuring a default user account through the DHCP server 182. Only when the vendor class identifier contained in the DHCP discover message 282 matches the target vendor class identifier, the DHCP server 182 includes the pre-selected domain name and the pre-selected user name in the offer message 284 as described supra. Otherwise, the DHCP server 182 may decide not to include the pre-selected domain name and the pre-selected user name in the offer message 284. In this example, the vendor class identifier included in the DHCP discover message 282 matches the target vendor class identifier.

In this example, subsequently at operation 216, the DHCP server 182 broadcasts the offer message 284 with the pre-selected domain name and the pre-selected user name in the communication network 170. The network manager 136 of the BMC 102 accordingly receives the offer message 284.

At operation 218, the network manager 136 of the BMC 102 parses the offer message 284 to extract the data elements contained in the offer message 284. As such, the network manager 136 obtains the IP address offered by the DHCP server 182, the pre-selected domain name and user name contained in the DHCP options, etc. The network manager 136 then sends the pre-selected domain name and user name to the user manager 139. The user manager 139 accordingly configures a default user account, which is assigned to a user identified by the pre-selected user name and a domain identified by the pre-selected domain name. In particular, the user manager 139 may grant administrator's rights and privileges to the default user account. That is, the default user account has all the rights and privileges to operate and control the BMC 102.

At operation 220, the network manager 136 of the BMC 102 broadcasts a DHCP request message 286 in the communication network 170. The DHCP request message 286 includes data elements indicating a request for IP address offered by the DHCP server 182 to the BMC 102. Accordingly, the DHCP server 182 receives the DHCP request message 286.

At operation 222, the DHCP server 182 sends a DHCP acknowledgment message 288 to the BMC 102. The DHCP acknowledgment message 288 includes data elements indicating the lease duration and any other configuration information that the BMC 102 might have requested. Further, the DHCP acknowledgment message 288 may also include DHCP options indicating the pre-selected domain name and the pre-selected user name as described supra.

Upon receiving the DHCP acknowledgment message 288, the network manager 136 of the BMC 102, at operation 224, the network manager 136 configures network interface(s) of the BMC 102 with the offered IP address and other parameters provided in the offer message 284 and/or the DHCP acknowledgment message 288. Further, if for any reason the user manager 139 did not configure the default user account in operation 218, the network manager 136 may send the pre-selected domain name and user name to the user manager 139 again, and the user manager 139 may accordingly configure the default user account, as described supra.

Subsequently, at operation 226, the BMC 102 receives a request-to-log-on for logging onto the BMC 102. For example, an administrator who is tasked to configure the BMC 102 may be informed of the pre-selected domain name and user name of the default user account of the BMC 102. The administrator may attempt to log onto the BMC 102 from the remote device 194. The request-to-log-on includes user credentials (e.g., input by the administrator). In particular, the user credentials may include a domain name, a user name, and a password. Upon receiving the request-to-log-on, the user manager 139 extracts the domain name and the user name contained in the user credentials and compares them with the pre-selected domain name and user name of the default user account. If the two domain names or the two user names do not match, the user manager 139 may discard or ignore the request-to-log-on. Alternatively, the user manager 139 may send a denial response to the requester (e.g., the remote device 194).

When both the domain name and the user name contained in the user credentials match the pre-selected domain name and the pre-selected user name of the default user account, at operation 228, the user manager 139 select an authentication server that serves the domain identified by the domain name. In this example, the user manager 139 selects the directory server 184. Accordingly, the user manager 139 sends the user credentials contained in the request-to-log-on to the directory server 184 for authentication.

At operation 230, the directory server 184 sends an authentication response to the user manager 139. The authentication response indicates whether the user credentials have passed the authentication. When the user credentials did not pass the authentication, the user manager 139 may discard or ignore the request-to-log-on. Alternatively, the user manager 139 may send a denial response to the requester (e.g., the remote device 194).

When the user credentials pass the authentication, at operation 232, the user manager 139 may instruct the session manager 134 to open a user session for the default user account and allows a user of the default user account to access the BMC 102. As such, in this example, the administrator can log onto the BMC 102 from the remote device 194. The administrator may further configure the BMC 102 under the default user account.

Figure 3:
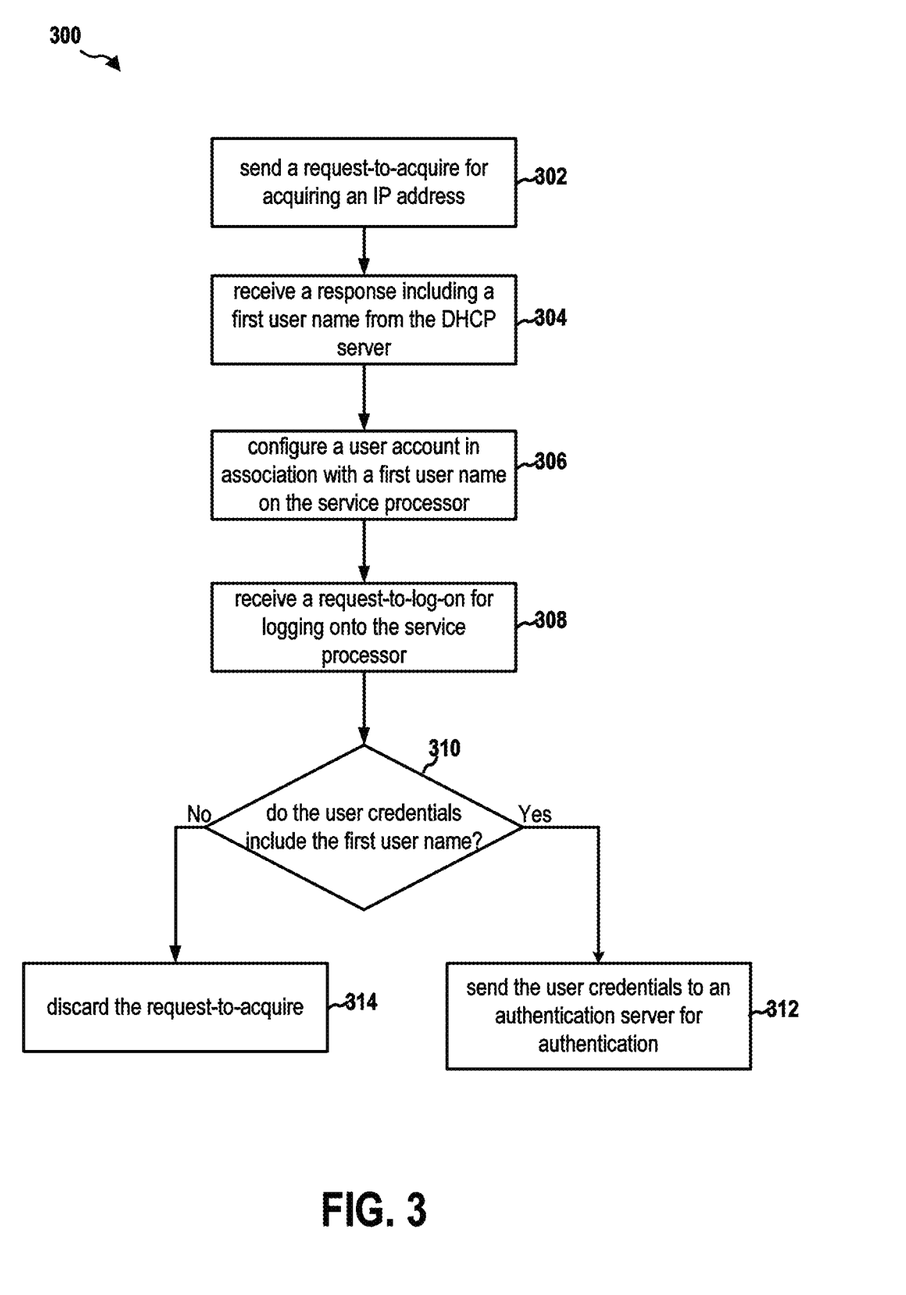
FIG. 3 is a flow chart of a method (process) for obtaining default user account information.

FIG. 3 is a flow chart 300 of a method (process) for obtaining default user account information. The method may be performed by a service processor (e.g., the BMC 102 and the apparatus 102') of a computer system. At operation 302, the service processor sends to a DHCP server (e.g., the DHCP server 182) a request-to-acquire (e.g., the DHCP discover message 282 or the DHCP request message 286) for acquiring an IP address. At operation 304, the service processor receives a response (e.g., the offer message 284 or the DHCP acknowledgment message 288) from the DHCP server. The response includes a first user name (e.g., the pre-selected user name). At operation 306, the service processor configures a user account in association with the first user name on the service processor. The user account allows access to the service processor. In certain configurations, the first user name is included in a vendor specific information option of the response.

At operation 308, the service processor receives a request-to-log-on (e.g., the request in operation 226) for logging onto the service processor. The request-to-log-on includes user credentials. At operation 310, the service processor determines whether the user credentials include the first user name. When the user credentials include the first user name, at operation 312, the service processor sends the user credentials (e.g., as in operation 228) to an authentication server (e.g., the directory server 184) for authentication. When the user credentials do not include the first user name, at operation 314, the service processor discards the request-to-log-on. In certain configurations, the response from the DHCP server 182 further includes an indication to a domain (e.g., the pre-selected domain name). The service processor selects the authentication server within the domain.

Figure 4:
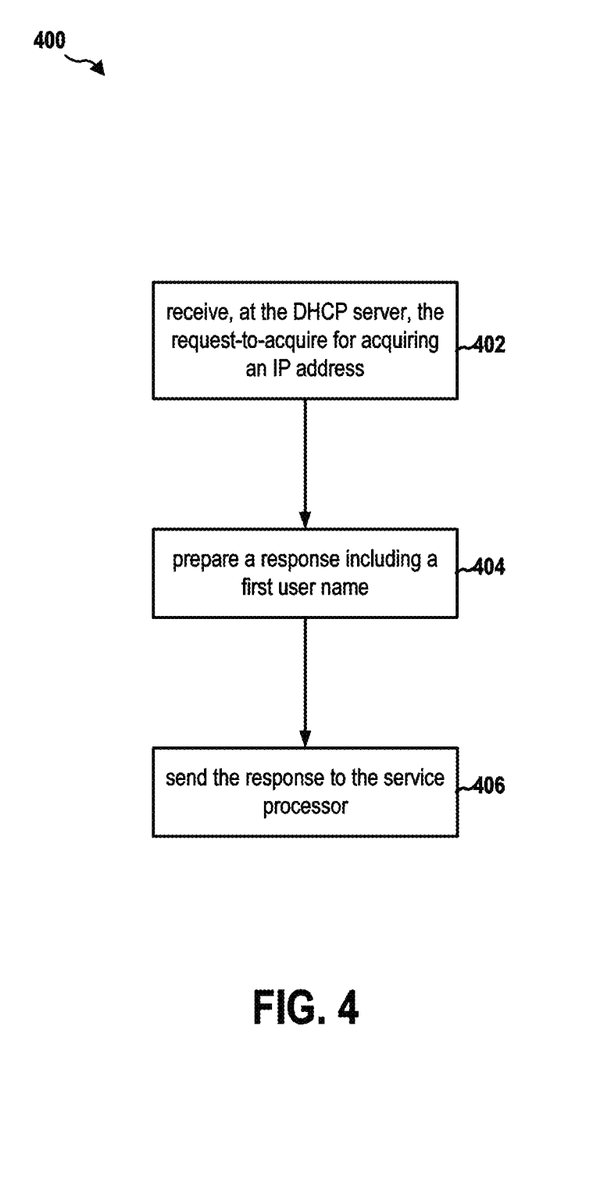
FIG. 4 is a flow chart of a method (process) for providing default user account information.

FIG. 4 is a flow chart 400 of a method (process) for providing default user account information. The method may be performed by a DHCP server (e.g., the DHCP server 182 and the apparatus 182') of a computer system. At operation 402, the DHCP server receives a request-to-acquire (e.g., the DHCP discover message 282 or the DHCP request message 286) for acquiring an IP address. At operation 404, the DHCP server prepares a response (e.g., the offer message 284 or the DHCP acknowledgment message 288) to the request-to-acquire, the response including a first user name. At operation 406, the DHCP server sends the response to the service processor. In certain configurations, the request-to-acquire includes a first identifier identifying a vendor class of the service processor. The DHCP server further determines whether the first identifier contained in the request-to-acquire matches a target identifier of the DHCP server. The DHCP server includes the first user name in the response when the first identifier matches the target identifier.

Figure 5:
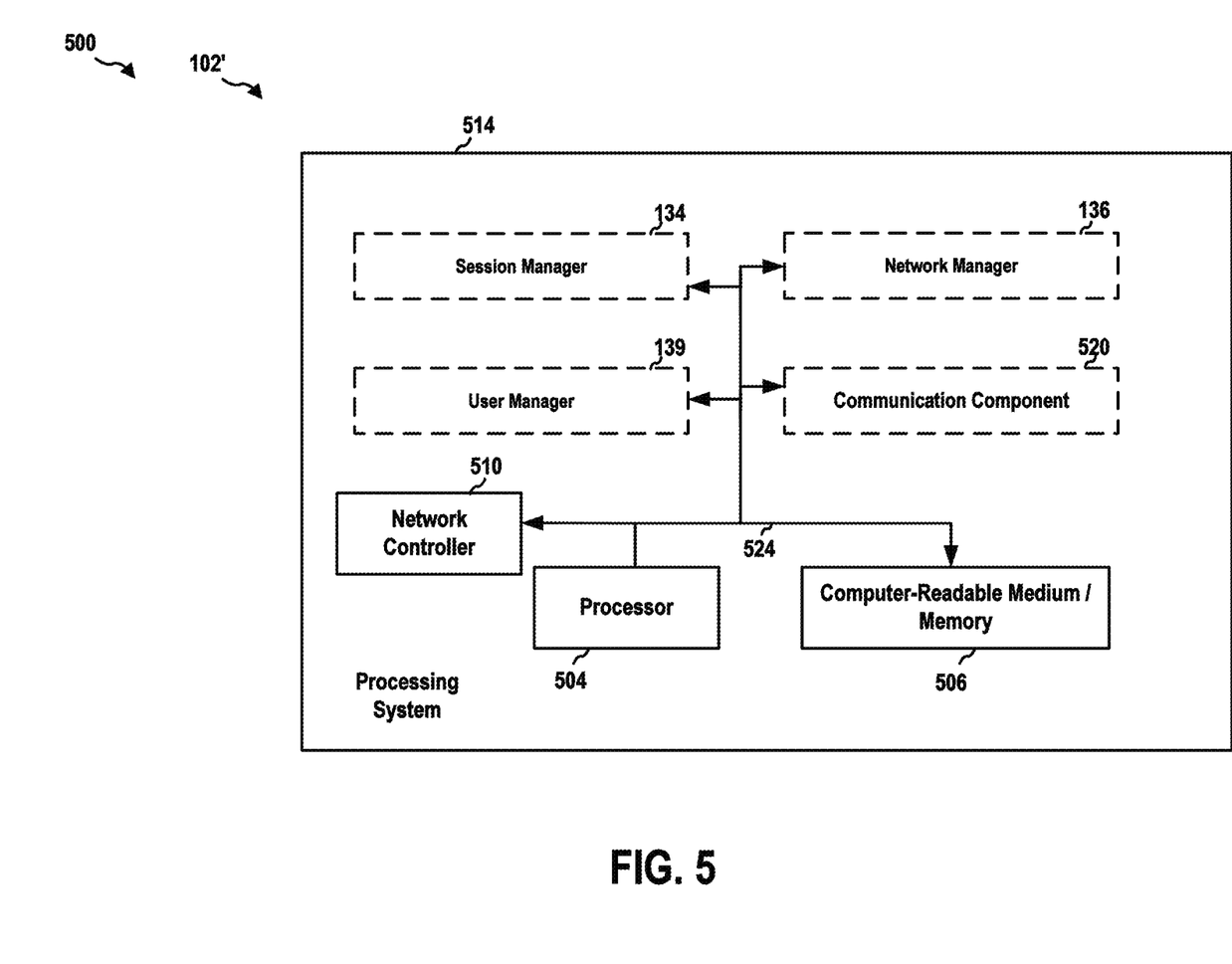
FIG. 5 is a diagram illustrating an example of a hardware implementation for an apparatus employing a processing system.

FIG. 5 is a diagram 500 illustrating an example of a hardware implementation for an apparatus 102' employing a processing system 514. The apparatus 102' may implement the BMC 102. The processing system 514 may be implemented with a bus architecture, represented generally by the bus 524 The bus 524 may include any number of interconnecting buses and bridges depending on the specific application of the processing system 514 and the overall design constraints. The bus 524 links together various circuits including one or more processors and/or hardware components, represented by the processor 504, the computer-readable medium/memory 506, a network controller 510, etc.

The computer-readable medium/memory 506 may include the memory 114 and/or the storage 117 The bus 524 may also link various other circuits such as timing sources, peripherals, voltage regulators, and power management circuits, which are well known in the art, and therefore, will not be described any further.

The processing system 514 may be coupled to the network controller 510. The network controller 510 provides a means for communicating with various other apparatus over a network. The network controller 510 receives a signal from the network, extracts information from the received signal, and provides the extracted information to the processing system 514, specifically a communication component 520 of the apparatus 102'. In addition, the network controller 510 receives information from the processing system 514, specifically the communication component 520, and based on the received information, generates a signal to be sent to the network. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system further includes at least one of the session manager 134, the network manager 136, and the user manager 139. The components may be software components running in the processor 504, resident/stored in the computer readable medium/memory 506, one or more hardware components coupled to the processor 504, or some combination thereof.

The apparatus 102' may be configured to include means for performing operations described supra referring to FIG. 3. The aforementioned means may be one or more of the aforementioned components of the apparatus 102 and/or the processing system 514 of the apparatus 102' configured to perform the functions recited by the aforementioned means.

Figure 6:
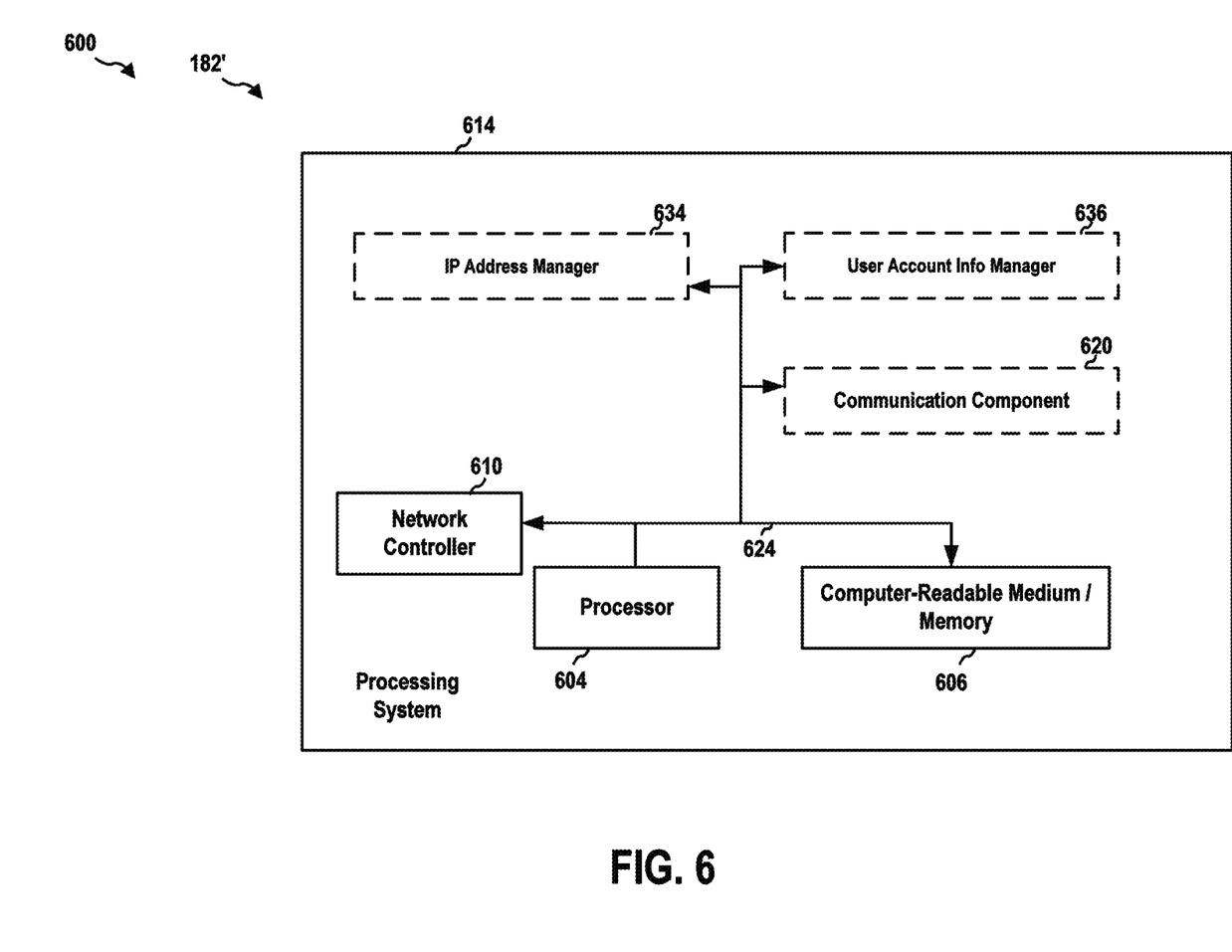
FIG. 6 is a diagram illustrating an example of a hardware implementation for another apparatus employing a processing system.

FIG. 6 is a diagram 600 illustrating an example of a hardware implementation for an apparatus 182' employing a processing system 614. The apparatus 182' may implement the DHCP server 182. The processing system 614 may be implemented with a bus architecture, represented generally by the bus 624 The bus 624 may include any number of interconnecting buses and bridges depending on the specific application of the processing system 614 and the overall design constraints. The bus 624 links together various circuits including one or more processors and/or hardware components, represented by the processor 604, the computer-readable medium/memory 606, a network controller 610, etc.

The computer-readable medium/memory 606 may include the memory 114 and/or the storage 117 The bus 624 may also link various other circuits such as timing sources, peripherals, voltage regulators, and power management circuits, which are well known in the art, and therefore, will not be described any further.

The processing system 614 may be coupled to the network controller 610. The network controller 610 provides a means for communicating with various other apparatus over a network. The network controller 610 receives a signal from the network, extracts information from the received signal, and provides the extracted information to the processing system 614, specifically a communication component 620 of the apparatus 182'. In addition, the network controller 610 receives information from the processing system 614, specifically the communication component 620, and based on the received information, generates a signal to be sent to the network. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system further includes at least one of the IP address manager component 634 and the user account information manager component 636. The components may be software components running in the processor 604, resident/stored in the computer readable medium/memory 606, one or more hardware components coupled to the processor 604, or some combination thereof.

In particular, the communication component 620 receives a request-to-acquire for acquiring an IP address from a requester (e.g., the BMC 102). The IP address manager component 634 may assign an IP address to the requester and prepares a response including the IP address. The user account information manager component 636 includes pre-selected domain name and user name in the response. The communication component 620 then sends the response to the requester.

The apparatus 182' may be configured to include means for performing operations described supra referring to FIG. 4. The aforementioned means may be one or more of the aforementioned components of the apparatus 182 and/or the processing system 614 of the apparatus 182' configured to perform the functions recited by the aforementioned means.

Figure 7:
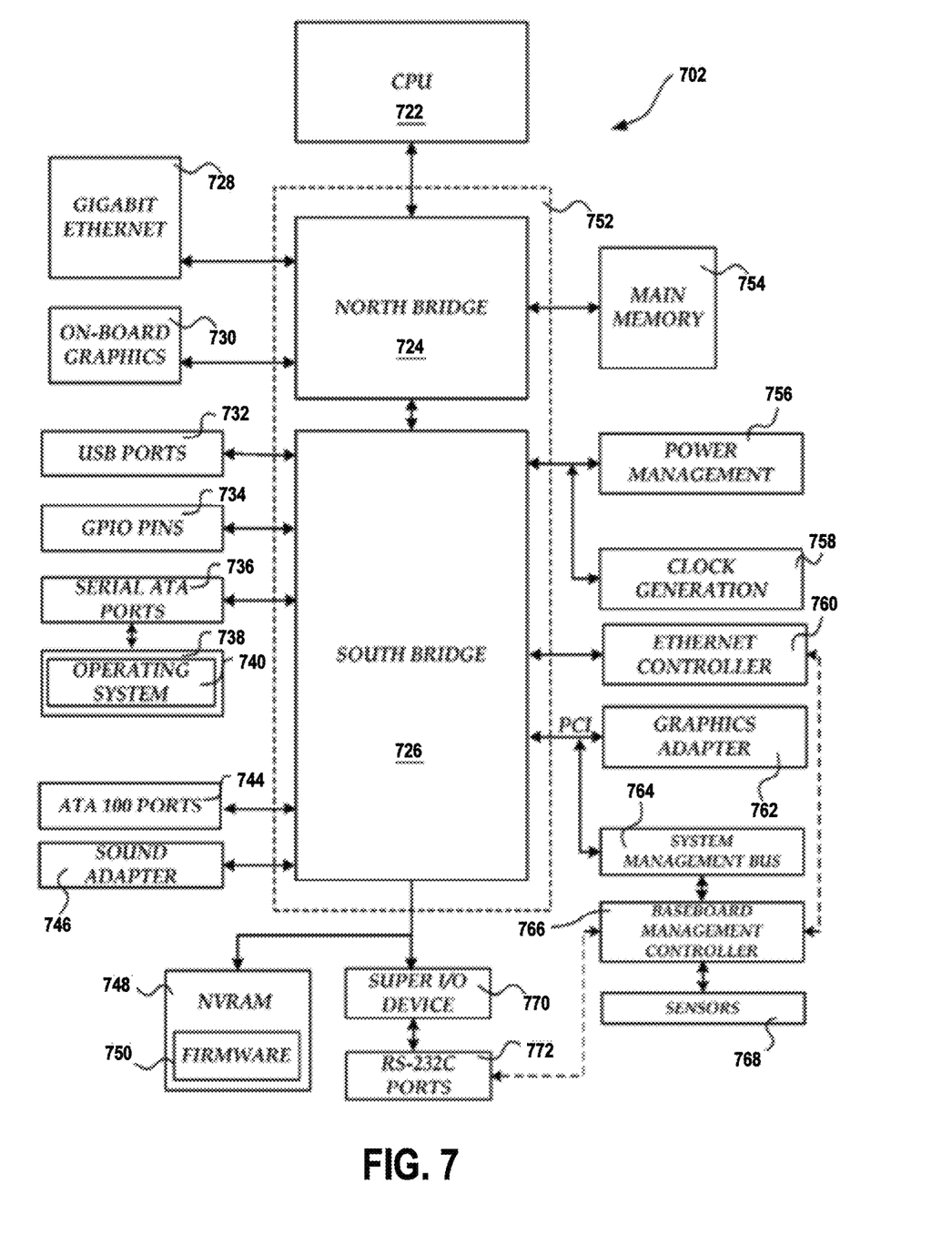
FIG. 7 shows a system architecture for a computer.

FIG. 7 and the following discussion are intended to provide a brief, general description of one suitable computing environment in which aspects of the embodiments described herein may be implemented. In particular, FIG. 7 shows a computer architecture for a computer 702 that may be utilized to embody the host computer 180, as described supra. It should be appreciated that the computer architecture shown in FIG. 7 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 702 shown in FIG. 7 includes a baseboard, or "motherboard," which is a printed circuit board to which a multitude of components or devices may be connected by way of a system bus or other electrical communication path. In one illustrative embodiment, a CPU 722 operates in conjunction with a chipset 752. The CPU 722 is a standard central processor that performs arithmetic and logical operations necessary for the operation of the computer. The server computer 702 may include a multitude of CPUs 722.

The chipset 752 includes a north bridge 724 and a south bridge 726. The north bridge 724 provides an interface between the CPU 722 and the remainder of the computer 702. The north bridge 724 also provides an interface to a random access memory ("RAM") used as the main memory 754 in the computer 702 and, possibly, to an on-board graphics adapter 730. The north bridge 724 may also include functionality for providing networking functionality through a gigabit Ethernet adapter 728. The gigabit Ethernet adapter 728 is capable of connecting the computer 702 to another computer via a network. Connections which may be made by the network adapter 728 may include LAN or WAN connections. LAN and WAN networking environments are commonplace in offices, enterprise-wide computer networks, intranets, and the internet. The north bridge 724 is connected to the south bridge 726.

The south bridge 726 is responsible for controlling many of the input/output functions of the computer 702. In particular, the south bridge 726 may provide one or more USB ports 732, a sound adapter 746, an Ethernet controller 760, and one or more GPIO pins 734. The south bridge 726 may also provide a bus for interfacing peripheral card devices such as a graphics adapter 762. In one embodiment, the bus comprises a PCI bus. The south bridge 726 may also provide a system management bus 764 for use in managing the various components of the computer 702. Additional details regarding the operation of the system management bus 764 and its connected components are provided below.

The south bridge 726 is also operative to provide one or more interfaces for connecting mass storage devices to the computer 702. For instance, according to an embodiment, the south bridge 726 includes a serial advanced technology attachment ("SATA") adapter for providing one or more SATA ports 736 and an ATA 100 adapter for providing one or more ATA 100 ports 744. The SATA ports 736 and the ATA 100 ports 744 may be, in turn, connected to one or more mass storage devices such as the SATA disk drive 738 storing an operating system 740 and application programs.

As known to those skilled in the art, an operating system 740 comprises a set of programs that control operations of a computer and allocation of resources. An application program is software that runs on top of the operating system software, or other runtime environment, and uses computer resources to perform application specific tasks desired by the user. According to one embodiment of the invention, the operating system 740 comprises the LINUX operating system. According to another embodiment of the invention the operating system 740 comprises an operating system within the WINDOWS family of operating systems from MICROSOFT CORPORATION. According to another embodiment, the operating system 740 comprises the UNIX, LINUX, or SOLARIS operating system. It should be appreciated that other operating systems may also be utilized.

The mass storage devices connected to the south bridge 726, and their associated computer storage media, provide non-volatile storage for the computer 702. Although the description of computer storage media contained herein refers to a mass storage device, such as a hard disk or CD-ROM drive, it should be appreciated by those skilled in the art that computer storage media can be any available media that can be accessed by the computer 702.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 726 for connecting a "Super I/O" device 770. The Super I/O device 770 is responsible for providing a number of input/output ports, including a keyboard port, a mouse port, a serial interface 772, a parallel port, and other types of input/output ports. The LPC interface may also connect a computer storage media such as a ROM or a flash memory such as a NVRAM 748 for storing the firmware 750 that includes program code containing the basic routines that help to start up the computer 702 and to transfer information between elements within the computer 702.

As described briefly above, the south bridge 726 may include a system management bus 764. The system management bus 764 may include a BMC 766. The BMC 766 may be the BMC 102. In general, the BMC 766 is a microcontroller that monitors operation of the computer system 702. In a more specific embodiment, the BMC 766 monitors health-related aspects associated with the computer system 702, such as, but not limited to, the temperature of one or more components of the computer system 702, speed of rotational components (e.g., spindle motor, CPU Fan, etc.) within the system, the voltage across or applied to one or more components within the system 702, and the available or used capacity of memory devices within the system 702. To accomplish these monitoring functions, the BMC 766 is communicatively connected to one or more components by way of the management bus 764. In an embodiment, these components include sensor devices 768 for measuring various operating and performance-related parameters within the computer system 702. The sensor devices 768 may be either hardware or software based components configured or programmed to measure or detect one or more of the various operating and performance-related parameters.

It should also be appreciated that the computer 702 may comprise other types of computing devices, including handheld computers, embedded computer systems, personal digital assistants, and other types of computing devices known to those skilled in the art. It is also contemplated that the computer 702 may not include all of the components shown in FIG. 7, may include other components that are not explicitly shown in FIG. 7, or may utilize an architecture completely different than that shown in FIG. 7.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
sending, at a service processor of the computer system and to a Dynamic Host Configuration Protocol (DHCP) server, a request-to-acquire for acquiring an Internet Protocol (IP) address;
receiving a response from the DHCP server, the response including a first user name and an IP address assigned to the service processor by the DHCP server;
creating and configuring, at the service processor, a user account in association with the first user name on the service processor, the user account allowing access to the service processor;
receiving a request-to-log-on for logging onto the service processor, the request-to-log-on including user credentials;
determining whether the user credentials include the first user name;

sending the user credentials to an authentication server for authentication in response to a determination that the user credentials include the first user name; and discarding the request-to-log-on in response to a determination that the user credentials do not include the first user name.

2. The method of claim 1, wherein the first user name is included in a vendor specific information option of the response.

3. The method of claim 1, wherein the response further includes an indication to a domain, the method further comprising: selecting the authentication server within the domain.

4. The method of claim 1, wherein the computer system further includes the DHCP server, the method further comprising:

receiving, at the DHCP server, the request-to-acquire;
preparing the response including the first user name; and
sending the response to the service processor.

5. The method of claim 4, wherein the request-to-acquire includes a first identifier identifying a vendor class of the service processor, the method further comprising:

determining whether the first identifier contained in the request-to-acquire matches a target identifier of the DHCP server, wherein the first user name is included in the response when the first identifier matches the target identifier.

6. A computer system comprising:

a memory; and
at least one processor coupled to the memory and configured to:
send, at a service processor of the computer system and to a Dynamic Host Configuration Protocol (DHCP) server, a request-to-acquire for acquiring an Internet Protocol (IP) address;
receive a response from the DHCP server, the response including a first user name and an IP address assigned to the service processor by the DHCP server;
create and configure a user account in association with the first user name on the service processor, the user account allowing access to the service processor;
receive a request-to-log-on for logging onto the service processor, the request-to-log-on including user credentials;
determine whether the user credentials include the first user name;
send the user credentials to an authentication server for authentication in response to a determination that the user credentials include the first user name; and
discard the request-to-log-on in response to a determination that the user credentials do not include the first user name.

7. The computer system of claim 6, wherein the first user name is included in a vendor specific information option of the response.

8. The computer system of claim 6, wherein the response further includes an indication to a domain, wherein the at least one processor is further configured to select the authentication server within the domain.

9. The computer system of claim 6, wherein the computer system further includes the DHCP server, wherein the at least one processor is further configured to:

receive, at the DHCP server, the request-to-acquire;
prepare the response including the first user name; and
send the response to the service processor.

10. The computer system of claim 9, wherein the request-to-acquire includes a first identifier identifying a vendor class of the service processor, wherein the at least one processor is further configured to determine whether the first identifier contained in the request-to-acquire matches a target identifier of the DHCP server, wherein the first user name is included in the response when the first identifier matches the target identifier.

11. A non-transitory computer-readable medium storing computer executable code for operating a computer system, comprising code to:

send, at a service processor of the computer system and to a Dynamic Host Configuration Protocol (DHCP) server, a request-to-acquire for acquiring an Internet Protocol (IP) address;
receive a response from the DHCP server, the response including a first user name and an IP address assigned to the service processor by the DHCP server;
create and configure a user account in association with the first user name on the service processor, the user account allowing access to the service processor;
receive a request-to-log-on for logging onto the service processor, the request-to-log-on including user credentials;
determine whether the user credentials include the first user name;
send the user credentials to an authentication server for authentication in response to a determination that the user credentials include the first user name; and
discard the request-to-log-on in response to a determination that the user credentials do not include the first user name.

12. The non-transitory computer-readable medium of claim 11, wherein the first user name is included in a vendor specific information option of the response.

13. The non-transitory computer-readable medium of claim 11, wherein the response further includes an indication to a domain, wherein the code is further configured to select the authentication server within the domain.

14. The non-transitory computer-readable medium of claim 11, wherein the computer system further includes the DHCP server, wherein the code is further configured to:

receive, at the DHCP server, the request-to-acquire;
prepare the response including the first user name; and
send the response to the service processor.

* * * * *